United States Patent [19]
Stigson

[11] Patent Number: 5,609,392
[45] Date of Patent: Mar. 11, 1997

[54] INTEGRATED CHILD SEAT

[75] Inventor: Tomas Stigson, Skene, Sweden

[73] Assignee: Lear Seating Corporation, Southfield, Mich.

[21] Appl. No.: 579,747

[22] Filed: Dec. 28, 1995

[51] Int. Cl.⁶ ..................................... A47C 15/00
[52] U.S. Cl. .......................... 297/237; 297/234
[58] Field of Search ................... 297/237, 236, 297/234, 463.1

[56] References Cited

U.S. PATENT DOCUMENTS

| 1,063,809 | 6/1913 | Lawson. | |
|---|---|---|---|
| 1,379,316 | 5/1921 | Jorgensen et al.. | |
| 1,643,236 | 9/1927 | Bell. | |
| 4,768,827 | 9/1988 | Musgrove | 297/236 |
| 5,265,934 | 11/1993 | Forget | 297/237 |
| 5,282,666 | 2/1994 | Demick et al. | 297/237 |

FOREIGN PATENT DOCUMENTS

| 0608597A1 | 8/1994 | European Pat. Off.. | |
|---|---|---|---|
| 633159 | 1/1995 | European Pat. Off. | 297/237 |

Primary Examiner—Milton Nelson, Jr.
Attorney, Agent, or Firm—Howard & Howard

[57] ABSTRACT

An integrated child seat includes a movable cushion insert (16) that is supported on a seat frame (12) for movement between a lower position, wherein the cushion insert is aligned with a seating surface (15), and a raised position, wherein the cushion insert is disposed above the seating surface. When the cushion insert is in the raised position, it is available for use by a small child. The cushion insert is supported in the raised position by a foldable support assembly (18). A latch member (20) engages the support assembly and maintains the cushion insert in the raised position. A locking member (22) locks the cushion insert in a lower position. A release (24) releases the locking member when the cushion insert is to be moved from the lower position and releases the latch member when the cushion insert is to be moved from the raised position. A single push button actuator (26) provides simple operation of the release.

18 Claims, 2 Drawing Sheets

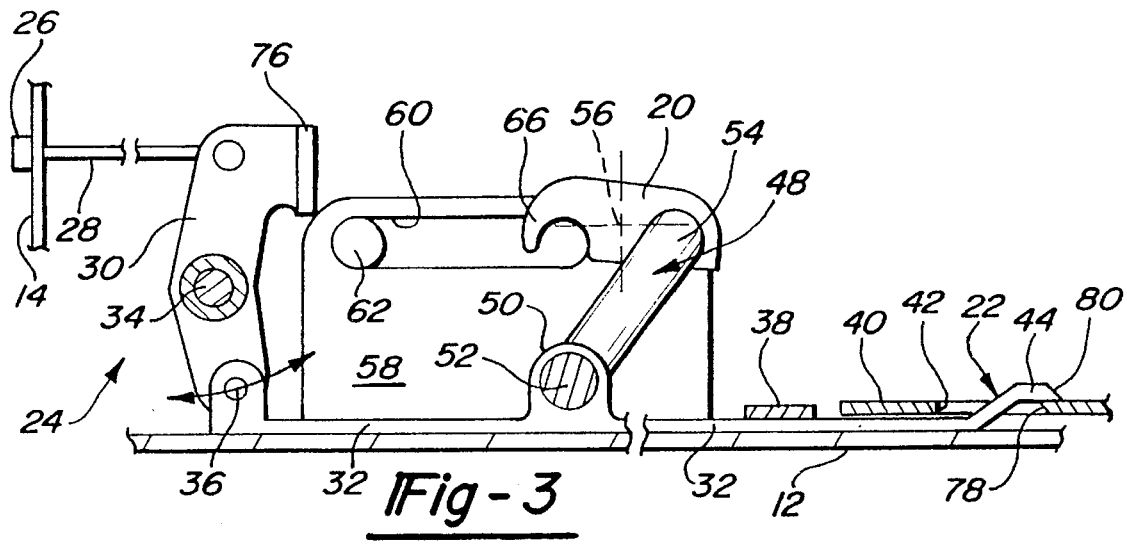
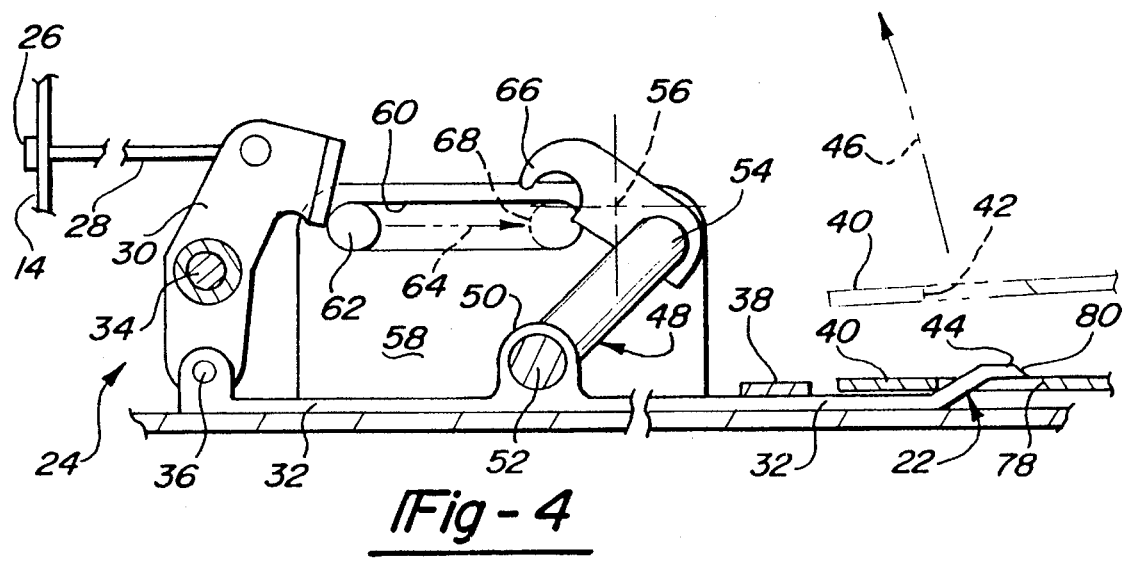
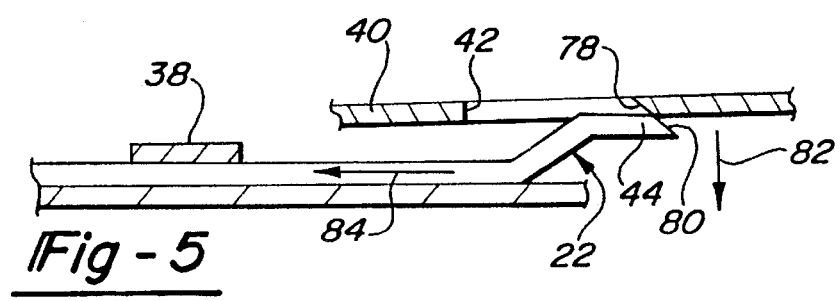

INTEGRATED CHILD SEAT

BACKGROUND OF THE INVENTION

This invention relates to a child seat for use in automotive vehicles and, more particularly, to a seat cushion insert that is foldable into a lower position, where it is integrated with a passenger seat, and a raised position, where it is positioned above the passenger seat to support a small child.

Infants and small children require special seating devices when travelling in automotive vehicles. A variety of child seats are commercially available. Most such child seats are an accessory purchased separately from a vehicle.

More recently, it has become feasible and desirable to provide child seats that are integrated within the passenger seat of the vehicle. One such child seat is shown in U.S. Pat. No. 5,265,934, issued on Nov. 30, 1993. The child seat shown in the '934 patent is an example of a booster-type child seat. Booster-type child seats are useful for toddlers because they allow a conventional seatbelt to be used to maintain a toddler in a safe position on the vehicle seat.

Although a variety of such child seats are available, many are not commercially practical for various reasons. For example, such child seats include a relatively large number of complex components that are too cumbersome to conveniently fit within a typical passenger seat, especially in smaller vehicles. Others, while having relatively more simple components, may not prove reliable or are too inconvenient or difficult to use.

Accordingly, it is desirable to provide a child seat that is integrated within a passenger seat having conveniently stowable, yet reliable, components that is aesthetically pleasing and simple to use. This invention provides such an integrated child seat by providing a cushion insert that is movable between a lower position, where the insert is aligned with the seating surface, and a raised position where the cushion insert is positioned to support a small child. A convenient, single push button actuator is provided, which allows a user to manipulate the cushion insert between the raised and lower positions.

SUMMARY OF THE INVENTION

In general terms, this invention is a seat having a seat frame and a cushion, which defines a seating surface, supported on the seat frame. The inventive seat includes a movable cushion insert that is supported on the seat frame for movement between a lower position, where the cushion insert is aligned with the seating surface, and a raised position, where the cushion insert is disposed above the seating surface. Support means support the cushion insert in the raised position and a latch member is provided for engaging the support means and maintaining the cushion insert in the raised position. A locking member locks the cushion insert in the lower position. The inventive seat is characterized by release means for releasing the locking member when the cushion insert is to be moved from the lower position and for releasing the latch member when the cushion insert is to be moved from the raised position.

BRIEF DESCRIPTION OF THE DRAWINGS

The above and other features and advantages of this invention will become apparent to those skilled in the art from the following detailed description of the presently preferred embodiment. The drawings that accompany the written description are briefly described as follows:

FIG. 3 is a cross-sectional view taken along the lines 3—3 in FIG. 2, illustrating selected components of a release means designed in accordance with this invention.

FIG. 4 is another view of the components illustrated in FIG. 3 in another position.

FIG. 5 is a cross-sectional view taken along the lines 3—3 of FIG. 2 illustrating, in more detail, the action of a locking member designed in accordance with this invention.

DETAILED DESCRIPTION OF THE PREFERRED EMBODIMENT

Figure 1:
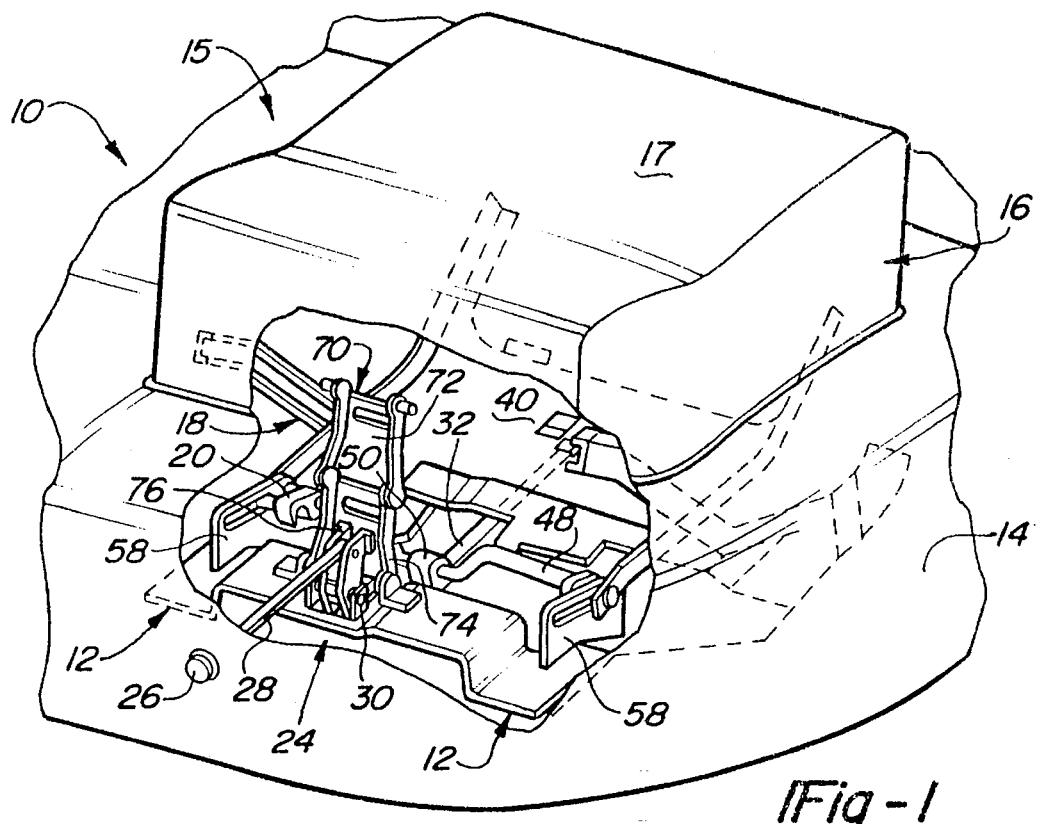
FIG. 1 is a partial cut-away perspective view of an integrated child seat cushion insert assembly designed in accordance with this invention, showing the cushion insert in a raised position.
Figure 2:
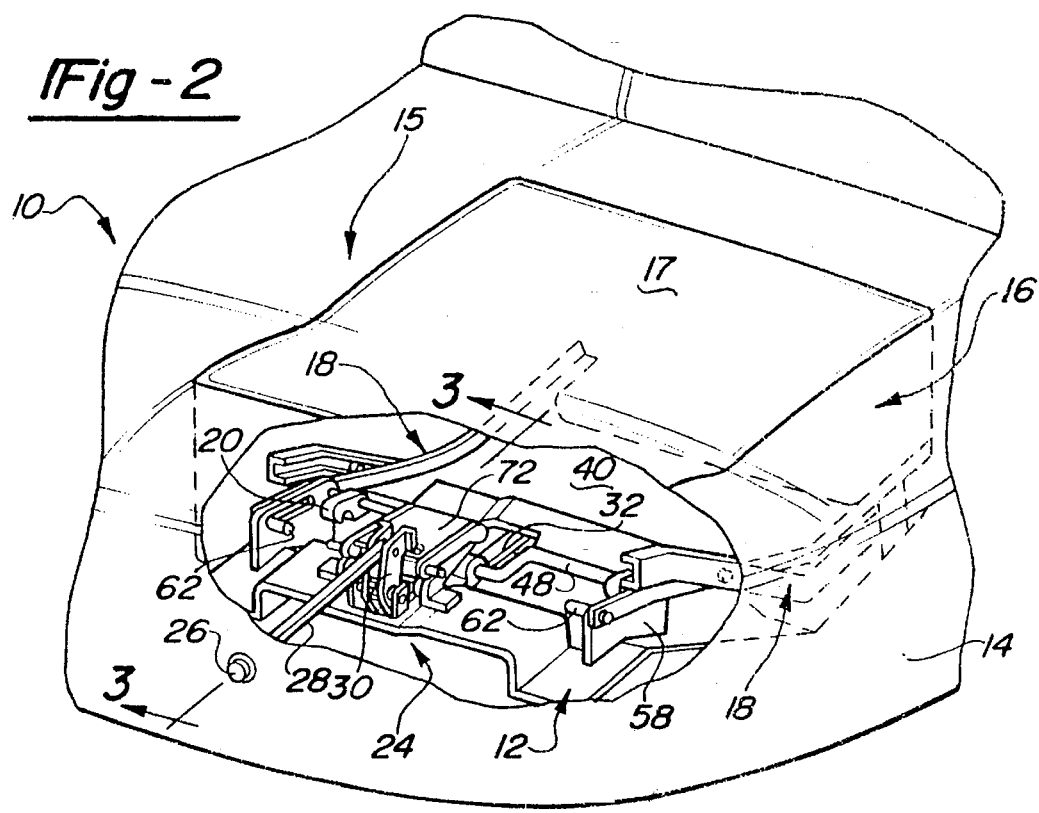
FIG. 2 shows the embodiment of FIG. 1 with the cushion insert in a lower position.

FIGS. 1 and 2 illustrate a portion of a seat 10 including a seat frame 12 and a cushion 14 supported on the seat frame 12. The cushion 14 has a top surface defining a seating surface 15. A movable cushion insert 16 has a cushion 17 on a base plate (not shown) that is supported on the seat frame 12 for movement between a lower position, wherein the cushion insert 16 is aligned with and forms a part of the seating surface 15 (illustrated in FIG. 2), and a raised child seating position, wherein the cushion insert 16 is disposed above and generally parallel to the seating surface 15 to support a small child (illustrated in FIG. 1). Support means 18 are provided for maintaining the cushion insert 16 in the raised position. In the illustrated embodiment, the support means 18 includes an arrangement of scissor arm support members.

A latch member 20 is provided to engage a portion of the support means 18 in order to maintain the cushion insert 16 in a raised position. A locking member 22 (illustrated in FIGS. 3 through 5) is provided for locking the cushion insert 16 in the lower position, where it is aligned with the seating surface 15. A single release means 24 releases the locking member 22 when the cushion insert 16 is to be moved from the lower position to the raised position. The same release means 24 releases the latch member 20 from the support means 18 when the cushion insert 16 is to be moved from the raised position into the lower position.

Referring now to FIGS. 1 through 4, the release means 24 includes an actuator 26, which preferably is a push button accessible from a front surface on the seat cushion 14. The push button 26 is directly connected to a lever 28. The lever 28 effects a connection between the push button 26 and a link member 30. The lever 28 is connected to one end of the link member 30 and a moving member 32 is connected to the other end of the link member 30. The moving member 32 preferably is a substantially rigid, generally flat bar.

The link member 30 is pivotally mounted on the seat frame 12 such that it is pivotal about the pivot point 34. When the push button 26 is pressed, the lever 28 moves the top portion of the link member 30 such that the link member pivots about a pivot point 34. A swivel connection between the moving member 32 and the link member 30 is provided at 36. As the link member 30 pivots about the pivot point 34, the moving member 32 slides within a guide track 38 toward the front of the seat cushion 14. Such a sliding motion is illustrated by comparing the views of FIGS. 3 and 4. As the push button 26 is pressed, the top portion of the link member 30 moves to the right (according to the drawings) and the lower portion of the link member 30 moves to the left (according to the drawings), thereby causing a sliding movement of the moving member 32 to the left as illustrated.

FIG. 3 illustrates selected portions of the cushion insert support structure and the release means in a position corresponding to the cushion insert 16 being in the lower position, as illustrated in FIG. 2. The cushion insert 16 is maintained in the lower position by the locking member 22. The support means 18 preferably is biased, by a spring, for example, such that it urges the cushion insert 16 into the raised position. Accordingly, locking member 22 maintains the cushion insert 16 in the lower position against the bias acting on the support means 18. The scissor arm arrangement 18 preferably includes a support plate 40, which extends between two of the scissor arms. The support plate 40 includes an opening 42 that is engaged by a hook member 44 on the locking member 22. FIG. 3 illustrates the hook member 44 extending through the opening 42 and engaging a portion of the support plate 40 in order to maintain the cushion insert 16 in the lower position.

Assuming that a user desires to move the cushion insert 16 into the raised position, the user simply presses push button 26. When push button 26 is pressed, the moving member 32 moves to the left (according to FIGS. 3 and 4) as explained above, which causes the hook member 44 to move through the opening 42. Once the end of the hook member 44 is clear of the support plate 40, the cushion insert 16 is urged upward into the raised position as generally indicated by the up arrow 46 in FIG. 4. Once the support means 18 is in a fully extended position, the cushion insert 16 is maintained in the raised position by the latch member 20. The operation of the latch member 20 is as follows.

The latch member 20 is connected to a bar 48. The bar 48 has a generally U-shaped mid-section (as can be seen best in FIGS. 1 and 2). A sleeve 50 on the moving member 32 receives a central portion 52 of the mid-section of the bar 48. The central portion 52 rotates within sleeve 50 as the moving member 32 slides within the guide track 38 as caused by movement of the link member 30. The longitudinal end 54 of the bar 48 is connected to the latch member 20. As the moving member 32 moves from the position illustrated in FIG. 3 to the position illustrated in FIG. 4, the longitudinal end 54 of the bar 48 is pulled generally downward, as illustrated. Such generally downward movement causes the latch member 20 to pivot about pivot point 56 because latch member 20 is pivotally mounted on a support piece 58. The support piece 58 preferably is formed integrally with the seat frame 12. The just-described motion of the latch member 20 is a movement from a latching position (illustrated in FIG. 3) to a release position or non-latching position (illustrated in FIG. 4).

The support piece 58 includes a slot 60 that receives a peg 62. The peg 62 is connected to one end of at least one of the scissor arms 18. As the scissor arm support means 18 moves from the folded position illustrated in FIG. 2 to the upright position illustrated in FIG. 1, the peg 62 slides along the slot 60 according to arrow 64 (i.e. to the right according to FIGS. 3 and 4). When the cushion insert 16 is in the fully raised position, a hook member 66, which is a part of the latch member 20, engages the peg 62. The peg 62 is, therefore, maintained in the position illustrated in phantom at 68 in FIG. 4. Without the latch member 20, the peg 62 would be moved along the slot 60 by a downward force applied to the cushion insert 16 such as that caused by a seated child. Since the peg 62 is not allowed to slide along the slot 60, the scissor arms 18 and, therefore, the cushion insert 16 are maintained in the upright position.

In the most preferred embodiment, an additional support brace 70 is provided for maintaining the cushion insert 16 in the upright, raised position. The support brace 70 preferably is an overcentered knee joint assembly. The support brace 70 includes a first link plate 72 and a second link plate 74, which function as in any conventional overcentered knee joint. When in the upright position, illustrated in FIG. 1, the link plates 72 and 74 can only be folded in one direction. The link member 30 is provided with a push surface 76 that facilitates folding the support brace 70 when the push button 26 is pressed in order to lower the seat cushion insert 16 from the raised position. As can be appreciated from the illustration in FIG. 1, the push surface 76 contacts the second link plate 74 to initiate folding the support brace 70 as the cushion insert 16 is moved downward.

When a user desires to move the cushion insert 16 from the raised position, the user simply presses the push button 26 and applies a downward force onto the cushion insert 16. As described above, when the push button 26 is pressed, the latch member 20 moves into the non-latching or release position and the support means 18 is foldable against the bias that otherwise urges the cushion insert into the raised position. As the cushion insert 16 is moved downward, the support plate 40 moves toward the locking member 22. As illustrated in FIG. 5, the opening 42 in the support plate 40 includes a ramped surface 78. The hook member 44 includes a cam surface 80. As the support plate 40 moves down according to the arrow 82, the ramped surface 78 eventually bears against the cam surface 80. The moving contact between the ramped surface 78 and the cam surface 80 forces the moving member 32 to move according to the arrow 84 (i.e. to the left in FIG. 5). Once the ramped surface 78 is clear of the cam surface 80, the hook member 44 protrudes through the opening 42 and engages a portion of the support plate 40 (as illustrated in FIG. 3, for example). The hook member 44 is maintained in a locking position by a biasing means, such as a spring, or the like.

Accordingly, a seat cushion insert designed in accordance with this invention provides an integrated child seat that is easily manipulated between a raised, use position and a lower, stowed position through a single push button actuator. The foregoing description is exemplary rather than limiting in nature. Variations and modifications to the above-described embodiment are possible that do not depart from the purview and spirit of this invention. For example, a foldable support structure other than a scissor arm arrangement could be used to maintain the cushion insert in the raised position. The scope of this invention is to be limited only by the appended claims wherein reference numerals are provided for convenience only and are not to be construed as limiting in any way.

What is claimed is:

1. A seat (10), comprising:

a seat frame (12);

a cushion (14) supported on said seat frame, said cushion defining a seating surface (15);

a moveable cushion insert (16) supported on said seat frame for movement between a lower passenger seating position, wherein said cushion insert is aligned with and defines a portion of said seating surface, and a raised child seating position, wherein said cushion insert is disposed above and generally parallel to said seating surface;

support means (18) for supporting said cushion insert in said raised position, said support means (18) including a scissor arm support structure;

a latch member (20) for engaging said support means and maintaining said cushion insert in said raised position, said latch member (20) engaging a portion of said scissor arm support structure when said cushion insert (16) is in said raised position;

a locking member (22) for locking said cushion insert in said lower position; and characterized by release means (24) for releasing said locking member (22) when said cushion insert is to be moved from said lower position and for releasing said latch member (20) when said cushion insert is to be moved from said raised position.

2. The seat of claim 1, wherein said release means includes a moving member (32) movably supported on said seat frame (12) for movement toward a release position, said moving member (32) operatively actuating said latch member (20) and said locking member (22) upon movement toward said release position.

3. The seat of claim 2, wherein said moving member (32) is slidingly supported on said seat frame (12) for sliding movement in a longitudinal direction toward said release position.

4. The seat of claim 3, wherein said moving member (32) comprises a substantially rigid, generally flat bar.

5. The seat of claim 2, wherein said release means (24) further includes an actuator (26) for moving said moving member (32).

6. The seat of claim 5, wherein said actuator (26) is supported on said seat frame and disposed on a front surface of said seat below said seating surface.

7. The seat of claim 5, wherein said actuator (26) comprises a push button.

8. The seat of claim 7, wherein said release means (24) further includes a link member (30) coupled at a first end to said moving member (32) and coupled at a second end to said push button (26), said link member (30) being pivotally supported by said seat frame (12) for pivotal movement such that said moving member moves into said release position upon said push button being pushed.

9. The seat of claim 2, wherein said latch member (20) is movably supported on said seat frame (12) for movement between a latching position to engage a portion of said support means (18) and a nonlatching position, said moving member (32) moving said latch member between said latching and nonlatching positions as said moving member moves into said release position.

10. The seat of claim 9, wherein said latch member (20) includes a hook member (66) for engaging a portion of said support means (18) in said latching position.

11. The seat of claim 10, wherein said latch member (20) further includes a bar (48) coupled to said hook member (66) and said moving member (32), said hook member being pivotally supported for pivotal movement between said latching and nonlatching positions, said bar causing said hook member to pivot between said latching and nonlatching positions responsive to movement of said moving member.

12. The seat of claim 11, wherein said latch member includes (20) two hook members (66), each said hook member being coupled to opposite longitudinal ends of said bar (48) and wherein said moving member (32) is coupled to said bar proximate to a longitudinal midpoint (52) of said bar.

13. The seat of claim 2, wherein said support means (18) includes a support plate (40) and wherein said locking member (22) comprises a hook portion (44) that is moveable between a locking position to engage said support plate when said cushion insert is in said lower position and a nonlocking position.

14. The seat of claim 13, wherein said hook portion (44) is connected to one end of said moving member (32) for movement with said moving member.

15. The seat of claim 14, wherein said support plate (40) includes an opening (42) and wherein said hook portion (44) engages said support plate at said opening.

16. The seat of claim 1, wherein said support means further includes a support brace (70) comprising two link plates (72, 74) pivotally coupled together for pivotal movement between a folded position when said cushion insert (16) is in said lower position and an upright position when said cushion insert is in said raised position.

17. The seat of claim 16, wherein said release means (24) includes a rigid moving member (32), a link member (30) coupled to said moving member and a push button actuator (26) coupled to said link member, said link member being pivotally supported on said seat frame (12) for pivotal movement in response to said push button being pushed, said pivotal movement of said link member causing said moving member to move relative to said seat frame, said movement of said moving member causing said latch member to move from a latching position to a nonlatching position and said movement of said moving member causing said locking member to move from a locking position to a nonlocking position.

18. A seat insert (16) for use in supporting a child upon a seat, comprising:

a base frame (12);

a cushion support plate supported on said base frame for movement between a lower position, wherein said cushion support plate is generally adjacent said frame, and a raised position, wherein said cushion support plate is spaced away from said base frame;

support means (18) for supporting said cushion support plate in said raised position, said support means (18) including a support brace (70) comprising two link plates (72, 74) pivotally coupled together for pivotal movement between a folded position when said cushion support plate is in said lower position and an upright position when said cushion support plate is in said raised position;

a latch member (20) for engaging said support means and maintaining said cushion support plate in said raised position;

a locking member (22) for locking said cushion plate in said lower position; and characterized by release means (24) for releasing said locking member when said cushion support plate is to be moved from said lower position and for releasing said latch member when said cushion support plate is to be moved from said raised position.

* * * * *